Patented Sept. 27, 1938

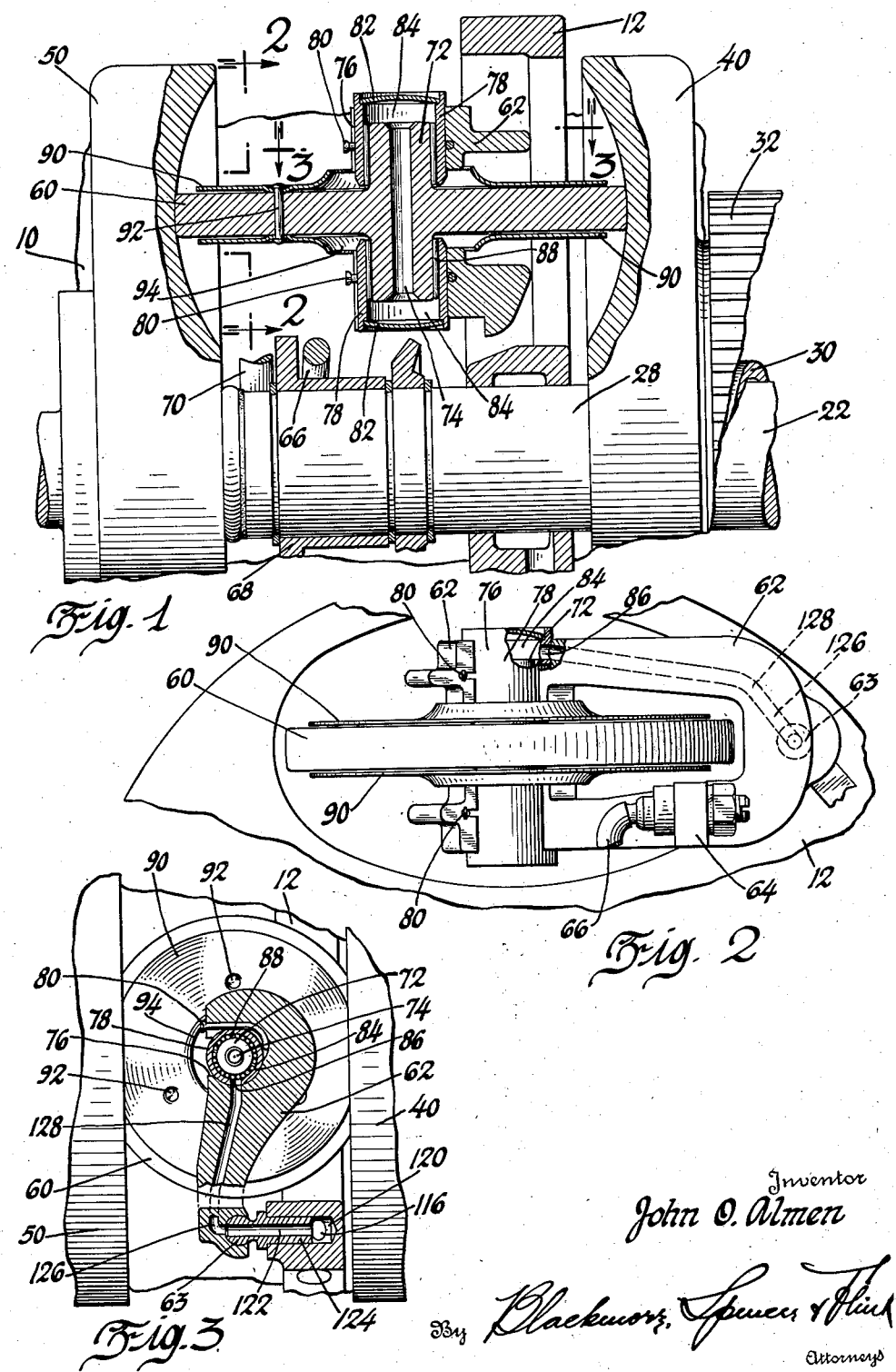

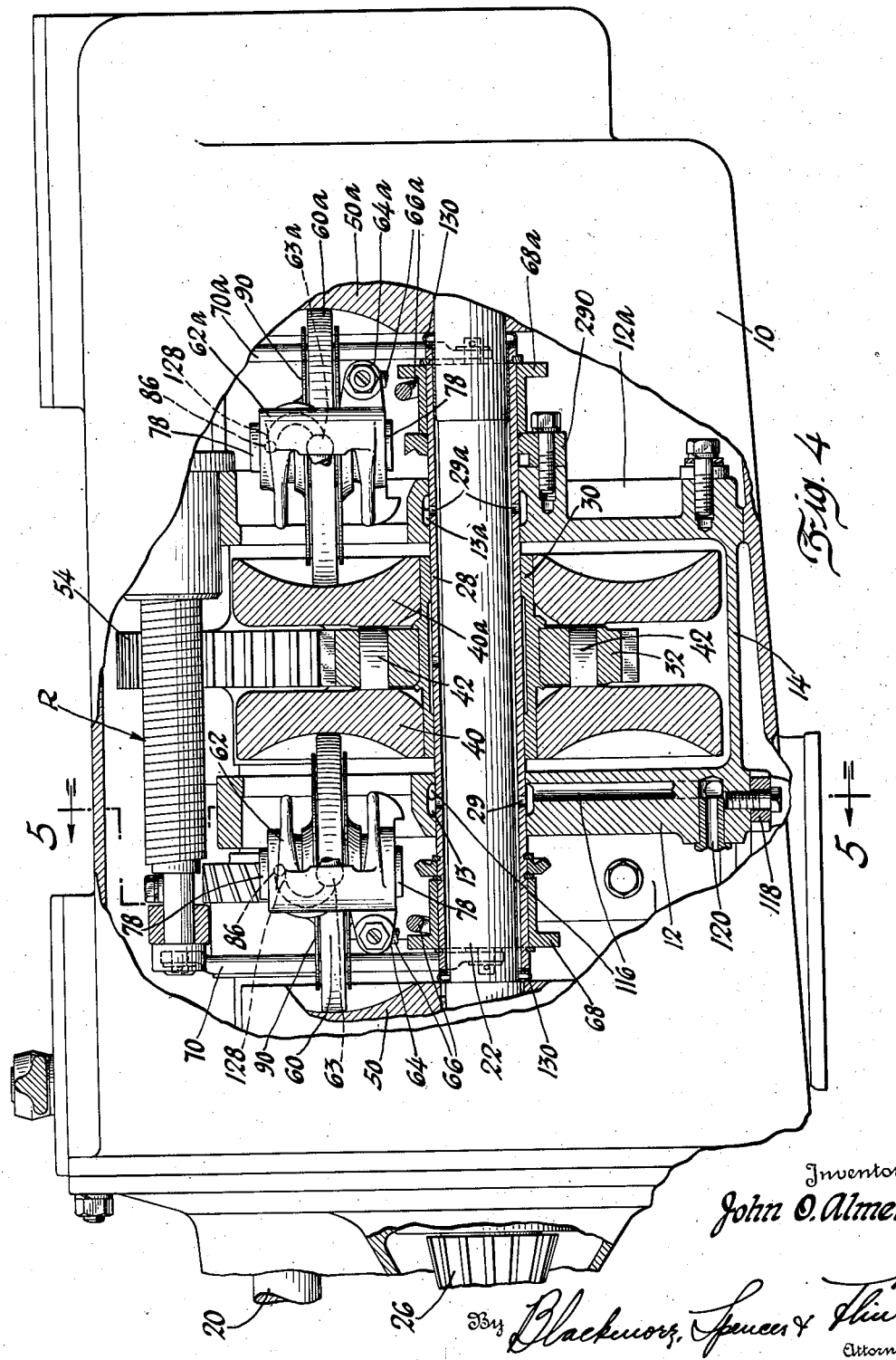

2,131,159

UNITED STATES PATENT OFFICE 2,131,159

COOLING TRANSMISSION ROLLERS

John O. Almen, Royal Oak, Mich., assignor to General Motors Corporation, Detroit, Mich., a corporation of Delaware Application May 11, 1934, Serial No. 725,039

6 Claims. (Cl. 184—6)

This invention relates to means for dissipating heat from and lubricating the working surfaces of the races and rollers of a friction roller transmission mechanism for motor vehicles.

The object is to prevent injury to the working surfaces of the rollers and races,—due to the generation of heat incident to the necessarily high pressure imposed on the elements of transmission mechanisms of this type operating under heavy loads—by transferring heat from said surfaces to a liquid.

The object is achieved by means for conducting cooling liquid, such as lubricating oil of suitable characteristics, to the surface of a rotating roller, in combination with means, such as a shroud or guide plate disposed substantially parallel with and slightly spaced from the liquid receiving surface of the roller, for confining the liquid and guiding it to the area of contact between roller and race. In the specific means illustrated the shroud or guide plates are disposed parallel with the side faces of the rollers, and cooling and lubricating liquid is conducted to the inner zone or zones of the roller near its axis, whence centrifugal force causes it to flow outward in sheet-like form to the traction area or areas.

In the accompanying drawings, in which like reference characters indicate like parts throughout the several views—

Fig. 1 is an elevation, partly in longitudinal section, of a fragment of a friction race and roller transmission mechanism embodying this invention, showing a carrier and shrouded roller in cross section on a plane including the race axis and roller axis;

Fig. 2 is a fragmentary view showing a roller and its forked carrier, as looked at in a direction parallel with the race axis toward the driving race;

Fig. 3 is a view on planes indicated by line 3—3 of Fig. 1;

Fig. 4 is an elevation, partly in vertical longitudinal section, of a "double toric" race and roller transmission mechanism to which this invention is applied;

Figure 5:
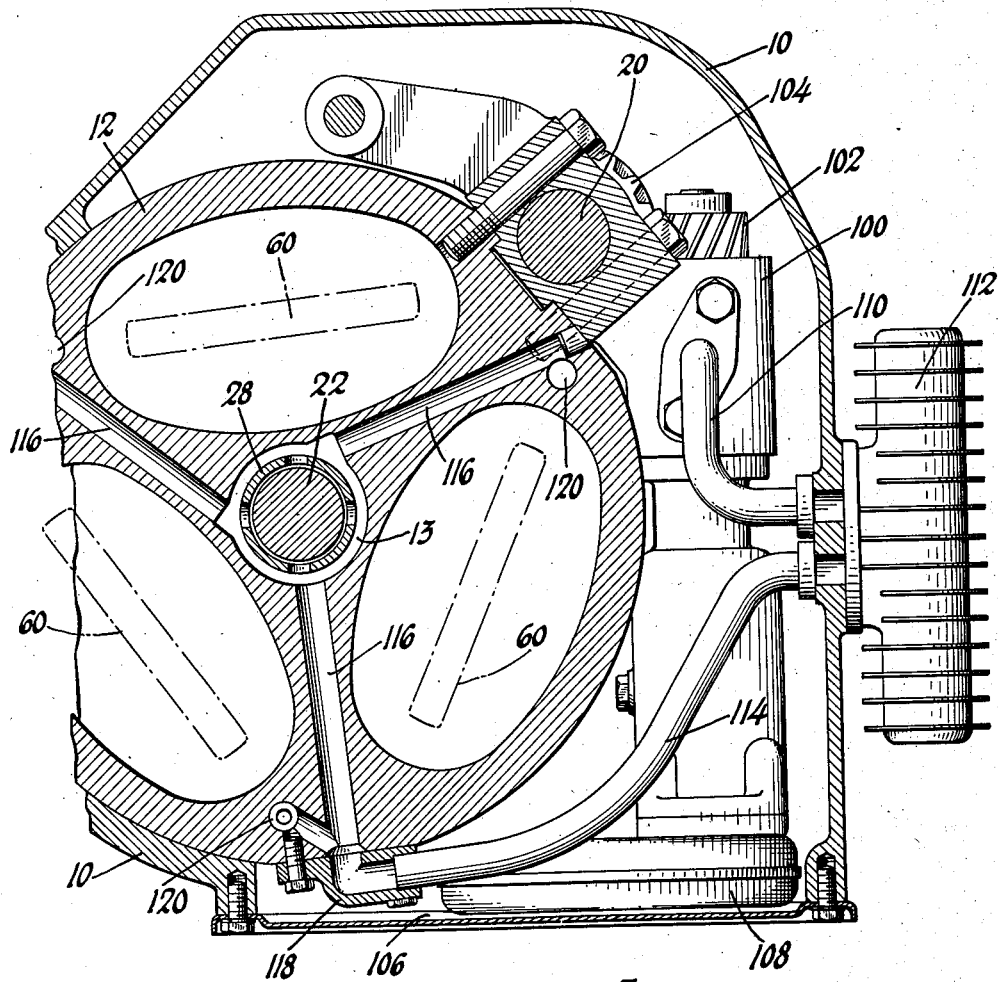
Fig. 5 is a section on two planes as indicated by line 5—5, Fig. 4.

In Fig. 4 is illustrated a transmission casing 10, in side elevation, broken away to expose, partly in section, parts of a "double toric" transmission mechanism, consisting of two sets of coaxial driving and driven races having toroidal raceways and two sets of intermediate transmission rollers engaging the raceways. Fixed within casing 10 are two parallel supporting and strengthening frame members 12 and 12a connected by a parti-cylindrical web 14. Members 12 and 12a have alined central holes for accommodating a frame tube 28 surrounding a power output shaft and openings symmetrically disposed around the centers for admitting transmission rollers. They also carry bearings for an input shaft and a control shaft to be described.

A driving or power input shaft 20 enters casing 10 through a bearing (not shown) in the front end and passes through bearings carried by members 12 and 12a. A driven or power output shaft 22 is also journaled in casing 10, its front end carrying a bevel pinion 26, designed to mesh with the ring gear of a differential axle gearing not shown. Within the casing tube 28 is fitted snugly in the central holes of members 12 and 12a which are formed with annular oil grooves 13, 13a around the tube. Shaft 22 passes through tube 28 and has a bearing fit within its rear end. The tube is elsewhere circumferentially spaced from the shaft and is provided with oil holes 29 and 29a placing in communication the oil grooves 13, 13a and the annular space between tube and shaft. Tube 28 and member 12a are rigidly connected by collar 290 which is fixed to the tube as by a weld and bolted to member 12a.

A tubular hub-like member 30 is rotatably mounted on tube 28 between the members 12 and 12a as shown in Fig. 4. Gear 32 is secured centrally to tubular member 30, portions of the tubular member protruding from both faces of the gear, the protruding portions serving as bearings for two driving races 40 and 40a. Gear 32 carries a plurality of differential elements, preferably rollers 42, rotatable on radial axes within slots formed through the gear.

Driven races 50 and 50a rotate with and drive output shaft 22 when the vehicle is being driven forward, said driven races rotating in a sense opposite to that of the rotation of the driving races as both driving and driven races are in power transmitting contact with intermediate power transmitting rollers to be described. In the particular transmission mechanism, in connection with which this invention is illustrated, race 50 is fixed to shaft 22 as by a key and abutment means preventing forward axial and rotative movement on the shaft. Race 50a is capable of limited angular and axial movements on shaft 22, as permitted by a torque responsive loading device (not shown) of any suitable known type, and by the transmission elements interposed between race 50a and race 50. Races 40 and 40a are driven by gear 32 through said differential rollers 42, and gear 32 is driven by a gear 54 adapted to be clutched to input shaft 20.

Power transmitting intermediate rollers referred to, indicated by 60, 60a, are mounted in forked carriers 62 and 62a, each of which is pivotally moored by a universal joint 63 or 63a to a supporting member 12 or 12a, whereby the carriers may maintain the roller centers substantially fixed with respect to the frame or casing but allow the movements necessary to ratio changing. In the mechanism illustrated, each carrier has a lug 64 or 64a on one face connected by links 66 or 66a, to a ring or collar 68 or 68a rotatable on tubular member 28. Each ring or collar 68 or 68a may be rocked in either sense by control member R which is equipped at each end with an arm connected respectively to links 70, 70a, connected to collars 68 and 68a. Through control device R, therefore, collars 68, 68a, may be rocked, thereby swinging carriers 62, 62a, around pivotal mooring joints 63, 63a, and causing inclination of each roller around an axis extending through the points of contact of the roller with the races, thereby steering the rollers to a higher or lower ratio position, according to the sense of movement imparted.

The mechanism thus far described pertains to this invention only insofar as it is necessary to disclose the best mode in which the principle thereof has been applied and impart to the public full information regarding making and using it.

The cooling and lubricating means, to which the invention more specifically relates, will now be described.

As all of the rollers 60, 60a are constructed alike and similarly mounted in the carriers 62, 62a, a description of roller 60 and its mounting, shown in Figs. 1, 2, 3 and 4, suffices for all of them. Each roller, as illustrated in Fig. 1, has an axle 72 projected from both faces of the roller. The axle 72 may be formed integral with the roller, as illustrated, or otherwise made rigid with it. A central hole 74 extends completely through axle and roller. The end portions of the limbs of carrier 62 are formed with alined bearing seats open at one side, as at 76, to form gaps of less diameter than the bearing seats, but wide enough to admit axle 72 of roller 60 sidewise. After admission of axle 72 into the bearing openings, bearing sleeves 78 are inserted endwise into the bearing openings, sleeved over the end portions of the axle, and locked in place as by keys 80. The ends of the bearing sleeves are spaced from the faces of the roller in order to permit some end play of the roller axle in the sleeves, as is necessary to effect inclination of the roller in response to inclination of the carrier. Each sleeve is plugged oil tight as by plugs 82, and provides a chamber 84 between each end of axle 72, and plugs 82, as shown in Fig. 1. A hole 86 in one of the sleeves 78, for admission of oil into one of the chambers 84, communicates with a source of oil, under pressure, to be described. Space for free flow of oil from chambers 84 to roller 60 is provided between sleeves 78 and axle 72. Needle bearing rollers 88, in the illustrated embodiment, permit oil to flow freely between them to the ends of the sleeves where oil is discharged onto the innermost zones of the roller faces, whence the oil flows outward under centrifugal force.

To concentrate or mass the oil discharged onto the faces of the roller at the inner zones adjacent the axle 72 so as to discharge it at the periphery of the roller, a confining and guiding shroud or plate 90 is disposed substantially parallel to each face of the roller. It is preferable to secure shroud 90 to the roller and allow it to rotate therewith. In the drawings, Figs. 1 and 3, shroud 90 is shown fixed to the roller by the expedient of embossing three or more equi-angularly spaced depressions in the sheet material of the shrouds and passing bolts or rivets 92 through these depressed areas and the roller thereby securing the shrouds spaced slightly from the faces of the roller. The shrouds may be formed as stamped disks of metal of a diameter somewhat smaller than that of the roller having a central hole 94 of greater diameter than that of the bearing sleeves 78. The material around the hole 94 is preferably drawn outward to form a crater-like conical entrance and collector for oil spouting from bearings 88 onto the roller. Oil thrown onto the inner zones of the roller, it will be perceived, will be thrown outward by the rotating roller, confined between the shrouds and the faces of the roller, and discharged forcibly onto the raceways in the path of the roller. Thus, the traction areas of rollers and races in contact will be continually drenched with cooling liquid during operation while liquid is being forced into the chambers 84.

In order to supply cooling and lubricating liquid to the rollers to be by them distributed as described, an oil pump 100 may be installed within casing 10, to be operated by input shaft 20. Any suitable type of pump may be used. The pump shown (Fig. 5) is a rotary pump having a rotor member equipped with a helical gear 102 arranged to mesh with a helical gear 104 on input shaft 20. The pump is disposed in position to draw cooling and lubricating liquid from sump 106 through screen 108 into the pump and discharge it through pipe 110 into a heat exchanger 112 whence it proceeds through pipe 114 to conduits and passages which conduct it to the several rollers and to other parts. As illustrated in Fig. 5, supporting member 12 has passages 116 drilled from periphery to central annular oil passage 13 so that liquid forced into one passage 116 will fill the others. The external orifice of one of said passages is in communication with a passage in a fixture 118 which is also in communication with pipe 114 connected with the discharge side of the pump. The other passages 116 are plugged at their outer extremities and all communicate by lateral ducts 120 with ducts 122 extending through pins 124 having spherical heads seated in spherical sockets formed in the carriers, which together constitute the before-mentioned universal mooring connections of the carriers 62 to the supporting member 12. Ducts 122 discharge into cross ducts 126 which unite with ducts 128, one extending along one of the limbs of each carrier. The ducts leading to and disposed in a carrier 62 are illustrated in Figs. 2 and 3. Duct 128 communicates with hole 86 in bearing sleeve 78 and thus supplies liquid to roller 60. Similar ducts and passages lead from the other two passages 116 to other carriers and rollers 62 and 60.

In order to supply rollers 60a with cooling and lubricating liquid, some of the liquid forced by pump 100 into one of said passages 116 in member 12, passes into annular oil passage 13 as described and thence flows into other passages 116 and so to rollers 60, while another portion flows through holes 29 in tube 28 to the annular space between said tube and shaft 22. The space between tube and shaft is sealed at each end as shown at 130. The liquid, therefore, fills the annular space and passes through holes 29a into annular oil groove 13a in member 12a. Member 12a is drilled with passages like passages 116 which are plugged at their outer extremities and connected with lateral ducts leading through carrier 62a to rollers 60a precisely as described with respect to conducting liquid to rollers 60.

Whenever the vehicle is traveling, pump 100 is circulating cooling and lubricating liquid from the reservoir to the rollers and races back to the reservoir, discharging liquid onto the inner portions of the rollers whence it is thrown by centrifugal force in sheets to drench the areas of working contact of rollers and races, thus carrying heat away from working areas thereby avoiding danger of pitting and scoring the working surfaces.

I claim:

1. In friction race and roller power transmission mechanism, the combination of a race, a roller in tractive engagement therewith, means for conducting liquid to and depositing it on a face of the roller adjacent its axis, and a plate spaced from said roller face adapted and arranged to confine and spread the liquid in sheet form between it and said roller face.

2. In friction power transmission mechanism of race and roller type, a roller in combination with means cooperating with at least one face thereof for guiding liquid radially outward and means for conducting liquid into the space between roller face and guide adjacent the axis of the roller.

3. In friction power transmission mechanism of race and roller type, a roller in combination with means secured to and spaced from at least one face of the roller for guiding liquid radially outward, and means for conducting liquid onto the space between roller face and guide adjacent the axis of the roller.

4. In friction power transmission mechanism of race and roller type, a roller in combination with means secured to and spaced from at least one face of the roller for guiding liquid radially outward, said means comprising a shroud of sheet material, and means for conducting liquid to the space between shroud and roller face adjacent the roller axis.

5. Means as defined in claim 4, wherein the shroud of sheet material has a central conoidal part provided with a central opening.

6. In friction race and roller power transmission mechanism, the combination of a race, a roller in tractive engagement therewith; means for conducting liquid to and depositing it on the roller surface, and a guiding shroud spaced from the roller surface for confining the liquid and guiding it to the traction areas of the roller and race.

JOHN O. ALMEN.